(12) United States Patent
Winnacker et al.

(10) Patent No.: US 6,864,593 B2
(45) Date of Patent: Mar. 8, 2005

(54) DEVICE FOR PRODUCING OF ELECTRIC ENERGY AND OF SIGNAL TRANSMITTING PRESSURE PULSES

(75) Inventors: Helmut Winnacker, Burgdorf (DE); Uwe Dräger, Barsinghausen (DE)

(73) Assignee: Precision Drilling Technology Services GmbH, Edemissen (DE)

( * ) Notice: Subject to any disclaimer, the term of this patent is extended or adjusted under 35 U.S.C. 154(b) by 0 days.

(21) Appl. No.: 10/695,512

(22) Filed: Oct. 28, 2003

(65) Prior Publication Data

US 2004/0085223 A1 May 6, 2004

(30) Foreign Application Priority Data

Nov. 4, 2002 (DE) .......................................... 102 51 496

(51) Int. Cl.[7] ................................................. H02P 9/04
(52) U.S. Cl. ............................. 290/43; 290/41; 290/45; 290/52; 290/40 C; 290/40 D; 290/54; 470/166; 470/140; 470/159
(58) Field of Search ............................. 290/43, 41, 45, 290/52, 54, 40 C, 40 D; 417/166; 415/159, 167, 140; 515/155

(56) References Cited

U.S. PATENT DOCUMENTS

| | | | |
|---|---|---|---|
| 4,956,823 A | | 9/1990 | Russell et al. |
| 6,259,165 B1 | * | 7/2001 | Brewington ................ 290/1 A |
| 6,489,692 B1 | * | 12/2002 | Gilbreth et al. ............... 290/52 |
| 6,727,600 B1 | * | 4/2004 | Abdurachmanov .......... 290/54 |
| 6,787,933 B2 | * | 9/2004 | Claude et al. ................ 290/52 |

FOREIGN PATENT DOCUMENTS

| | | | | |
|---|---|---|---|---|
| DE | 3439802 | * | 10/1984 | ........... E21B/47/12 |
| DE | 3439802 | | 6/1985 | |

* cited by examiner

*Primary Examiner*—Darren Schuberg
*Assistant Examiner*—Iraj A. Mohandesi
(74) *Attorney, Agent, or Firm*—Collard & Roe, P.C.

(57) ABSTRACT

The invention is directed to a device for the generation of pressure pulses, being intended for transmitting signals, in a fluid-carrying channel (2), using a pulser (1) designed to be integrated in the channel (2) and having a housing (4) and an adjustable throttling device by means of which the flow resistance can be varied at at least one point of the channel (2), an electrical generator (16), an impeller (9) exposed to the fluid passing through the channel and designed to drive the generator (16), a control device by means of which the load of the generator (16) can be varied in response to control signals, and an actuating device that is connected to the throttling element (12) and effects an adjustment of the throttling element responsively to the driving torque of the generator (16).

The impeller (9) is axially movably mounted and yieldingly supported against the direction of fluid flow such that the supporting force of the yielding support (21) increases as the axial movement of the impeller (9) increases, and the throttling device includes an axially adjustable throttling element (12) that is coupled to the impeller (9) in such a way that the throttling element (12) is adjusted in the sense of increasing the throttling effect by an axial movement of the impeller in the direction of fluid flow.

17 Claims, 2 Drawing Sheets

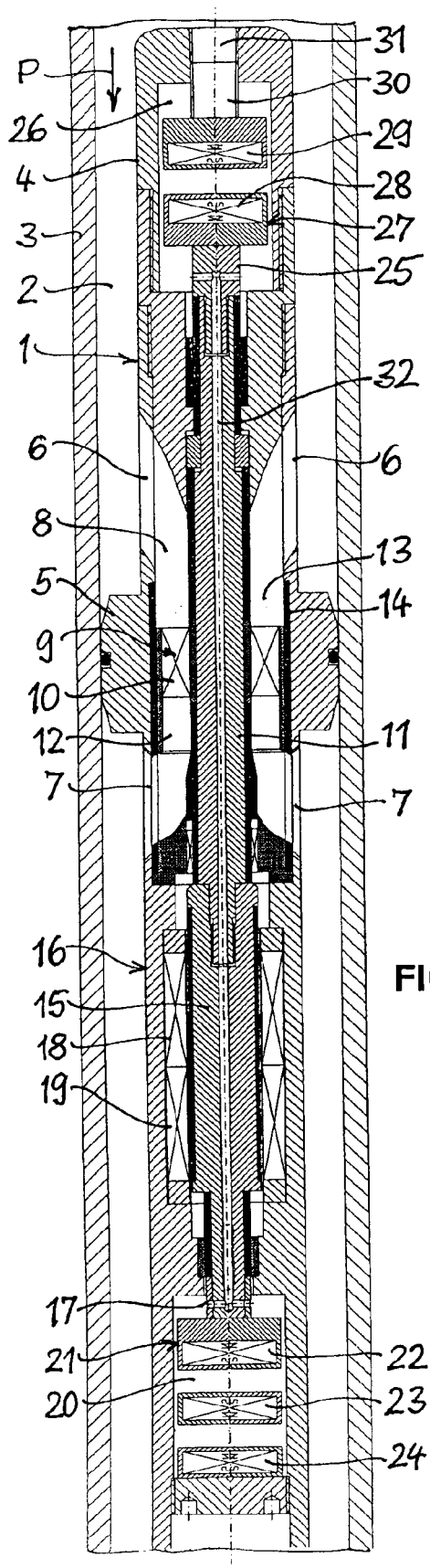
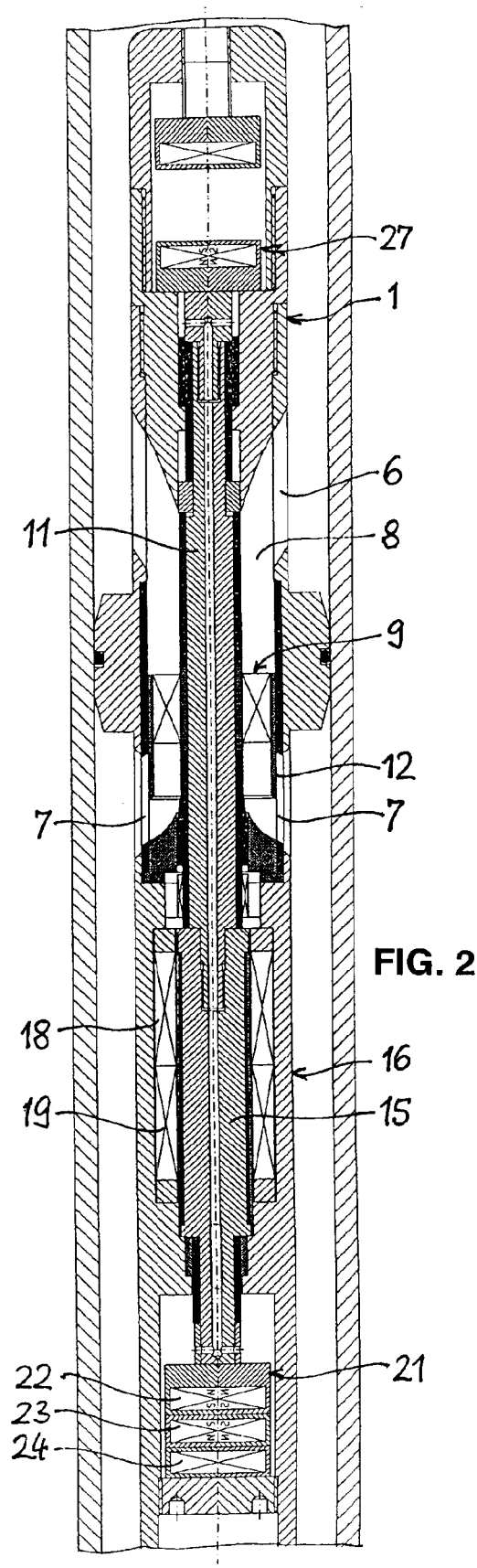
FIG. 1
FIG. 2

DEVICE FOR PRODUCING OF ELECTRIC ENERGY AND OF SIGNAL TRANSMITTING PRESSURE PULSES

This invention relates to a device for the generation of pressure pulses, being intended for transmitting signals, in a fluid-carrying channel, in particular a drill string for sinking a deep well, using a pulser designed to be integrated in the channel and having a housing and an adjustable throttling device by means of which the flow resistance can be varied at at least one point of the channel, an electrical generator having a stator and a rotor, an impeller exposed to the fluid passing through the channel and designed to drive the rotor, a control device by means of which the load of the generator can be varied in response to control signals, and an actuating device that is connected to the throttling element and effects an adjustment of the throttling element responsively to the driving torque of the generator.

Devices of the type described are used in deep well drilling in order to be able to transmit to the earth's surface measurement data obtained while the drilling by measurement instruments arranged in the drill string. With the aid of these devices, codified pressure pulses corresponding to the measurement data are generated in the drilling fluid and can be received and evaluated at the earth's surface.

From U.S. Pat. No. 4,956,823 there is known a device for the transmission of pressure signals within a flowing liquid, which comprises an impeller assembly that is arranged within a liquid flow and an electrical generator that is driven by said impeller assembly. The impeller assembly comprises a main impeller portion and a secondary impeller portion. The secondary impeller portion is rotatable relative to the main impeller portion in response to the load of the generator so as to vary the pressure drop across the impeller assembly, thus enabling the secondary impeller portion to be controlled by suitable variation of the generator load such that pressure signals are produced in the flowing liquid. This known device requires no additional hydraulic or electrical power source and can even supply the power requirement of associated measurement instrumentation.

Furthermore, from DE 34 39 802 there is known a borehole signal transmitter for a pressure pulse telemetry system, in which an annular impeller encompassed by a housing is driven by the drilling fluid transported through the drill rods. The impeller is used to drive a torque controlling device and an electrical generator. The torque controlling device can be switched over between two states by a signal transmitter in response to an input signal. In the one state the impeller can be driven relatively easily, which means that it is rotated at a relatively high speed by the drilling fluid, while in the other state a higher torque is needed to drive the impeller, so that it rotates at a relatively low speed. A suitable change of the input signal can thus be used to vary the impeller speed so as to generate a modulated pressure signal within the drilling fluid that can be sensed at the surface. In this arrangement the torque controlling device is a hydraulic circuit with a pump, which is driven by the impeller, and a valve device that can be switched over between a first and a second state.

It is an object of the present invention to provide a device of the type initially referred to, which is characterized by requiring little constructional effort and enables the generation of a particularly distinct and well readable pressure signal.

This object is accomplished in accordance with the present invention in that the impeller is axially movably mounted and yieldingly supported against the direction of fluid flow such that the supporting force of the yielding support increases as the axial movement of the impeller increases, and in that the throttling device includes an axially adjustable throttling element that is coupled to the impeller in such a way that the throttling element is adjusted in the sense of increasing the throttling effect by a movement of the impeller in the direction of fluid flow.

In the device of the present invention the variation of the pressure drop across the impeller resulting from a change in load of the generator causes an axial movement of the impeller that is transmitted to a throttling element in order to adjust the throttling device. The axially movable bearing arrangement of the impeller and its yielding axial support thus form the actuating device.

This arrangement according to the invention enables a simple and economical construction of the signal generating device. Furthermore, the throttling device can be constructed such that a comparatively large throttling effect is achievable with low adjustment forces. Hence it is possible with a low energy input to obtain pressure pulses that are very distinct and easy to differentiate from interfering factors. A further advantage to be seen in this arrangement is that the impeller is not directly used to achieve the throttling effect, meaning that it is not part of the throttling device and can therefore be adequately constructed to meet other requirements such as the minimization of wear and the optimization of the generator drive. In addition, it is also possible for the external dimensions, such as the overall length and in particular the diameter of the device according to the invention, to be kept advantageously small.

According to the invention the impeller can be fastened to an axially movable and rotatably mounted impeller shaft, and the impeller shaft can be rigidly coupled to the rotor of the generator. This enables a simple and economical construction, in which the attendant axial movability of the rotor of the generator is not a notable disadvantage and can be easily compensated for by increasing the rotor length of the generator.

The yielding support of the impeller or the impeller shaft is preferably formed using mutually repelling permanent magnets. It is thus possible for the yielding support of the impeller or the impeller shaft to be of non-contacting construction. The bearing friction which inevitably accompanies a friction or antifriction bearing and the heat developing as the result are thus avoided. Another positive aspect is the disproportionately high increase in the magnetic supporting force. Irrespective of the advantages of a permanent magnetic support it is also possible to use a compression spring as the yielding support, in which case the supporting force is transmitted by means of sliding or rolling bearings onto the impeller or its shaft.

To increase the length of axial travel, the yielding support can include three or more permanent magnets that are arranged in series one behind the other and can be moved relative to each other. Alternatively, the permanent magnets can also be supported by means of a compression spring on the housing.

According to a further proposal of the invention the impeller or the impeller shaft can be additionally supported on a positioning device that generates an adjustable loading force directed against the supporting force of the yielding support. With the aid of the positioning device it is possible to set the axial position of the unloaded impeller and hence also the minimal throttling effect of the throttling device. Furthermore, with the aid of the positioning device it is also possible to exert an advantageous effect on the force-travel characteristic of the yielding support. According to the invention the positioning device can also have mutually repelling permanent magnets in order to enable a non-contacting transmission of the load onto the impeller or the impeller shaft. In a simpler configuration the positioning device can be comprised of an axially adjustable axial bearing upon which the impeller or the impeller shaft takes support against the direction of flow of the impeller. It is also possible for the axial bearing to take support on the positioning device by means of a compression spring.

According to another proposal of the invention the impeller is arranged in an annulus of the housing that communicates with the channel on either side of the impeller, provision being made on at least one side of the impeller for at least one radial opening that connects the annulus to the channel, and the impeller has a cylindrical sleeve that at least partly covers the radial opening during an axial movement of the impeller in the direction of fluid flow, thus causing the current of fluid entering through the radial opening to be throttled. The radial opening is preferably arranged on the outlet side of the impeller, and the cylindrical sleeve extends in axial direction beyond the outlet edges of the impeller blades. On the inlet side of the impeller the connection to the annulus can be formed likewise by one or more radial openings.

While in the described configuration the throttling device is arranged in series with the impeller, this does not adversely affect the driving power of the impeller because the throttling essentially leads to just an increase of pressure whereas the delivery rate is affected to an insignificant degree only.

To be able to dampen the axial movement of the impeller during a change in load of the generator, the mutually opposing ends of the constructional unit comprised of the shafts of the impeller and the generator are each arranged in a compartment filled with a hydraulic medium, and both compartments are interconnected by a throttling channel that penetrates the shafts in particular. During an axial movement of the impeller, hydraulic medium is forced out of the one compartment through the outer pressure channel and into the other compartment, thus achieving an effective dampening effect. Hence the generation of unwanted oscillation movements of the impeller in axial direction is prevented.

The stator of the generator can have just one winding, but for many applications it is advantageous to provide two windings: a first winding for the electrical power requirement of a circuit, and a second winding that is connected to the controlling device for the signal-dependent loading of the generator.

The present invention will be explained in more detail in the following with reference to an embodiment illustrated in the accompanying drawings. In the drawings, FIG. 1 is a longitudinal sectional view of a pulser of the invention for generating pressure pulses in position of rest;

FIG. 2 is a view of the pulser of FIG. 1 in throttling position; and

Figure 3:
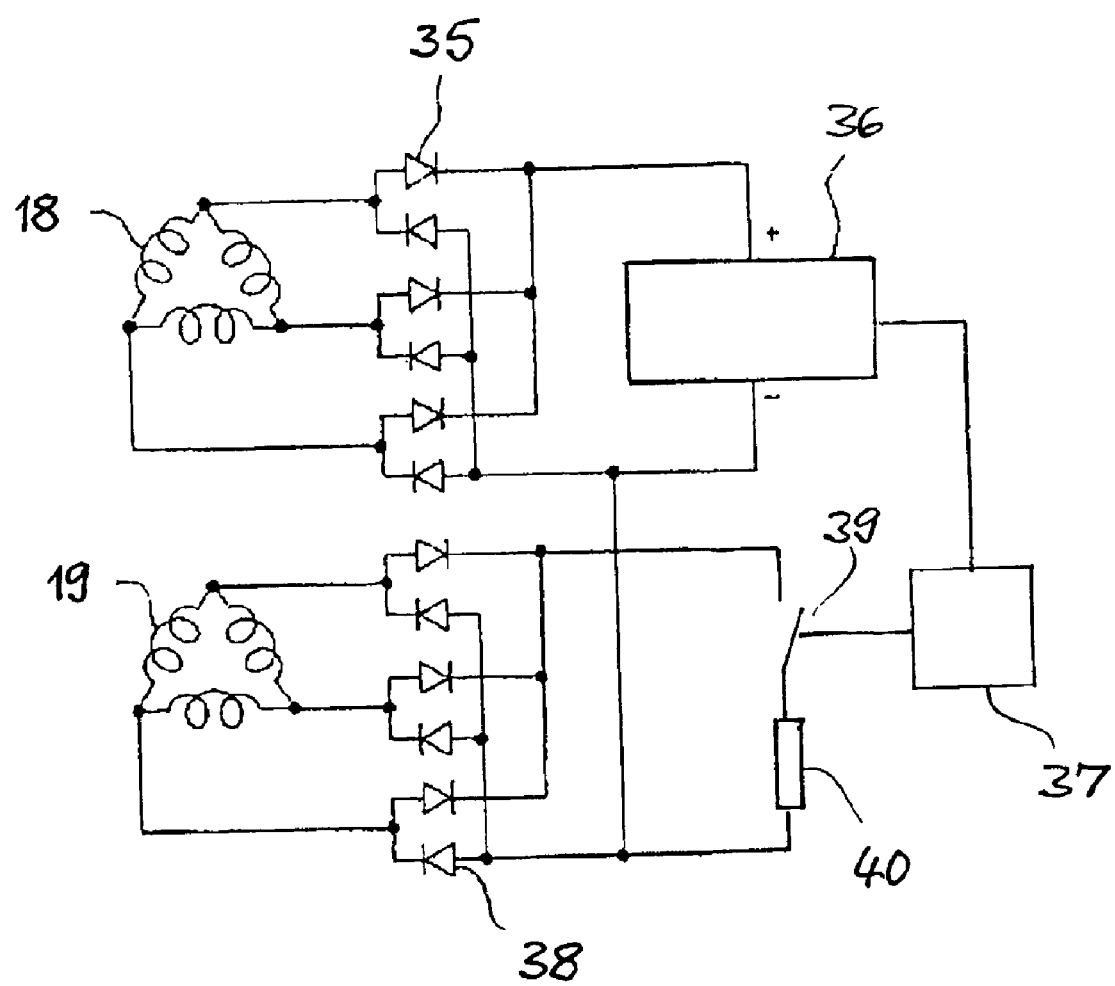
FIG. 3 is a circuit diagram of the generator with a signal controlling device.

The pulser 1 for generating pressure pulses shown in the drawings is part of a probe that is equipped with a series of measuring instrumentation for collecting measurement data while drilling. The probe is arranged in the channel 2 of a drill string 3 made up of drill pipes. Drilling fluid is pumped through the channel in the direction of the arrow P, escapes at the drill head into the borehole, and is used to carry out the drillings and, where applicable, to drive a drill motor.

The device 1 has an elongated, cylindrical housing 4 that is arranged coaxially with the drill string, is guided within the drill string 3 by means of a centering collar 5, and is sealed off from the drill string. With the exception of the centering collar 5, the housing 4 has an outer diameter that is far smaller than the inner diameter of the drill string 3. As the result, a sufficiently large annular space remains free between the housing 4 and the drill string 3 for the drilling fluid to flow through to the drill head.

In the housing 4 provision is made on one side of the centering collar 5 for inlet ports 6 and on the other side of the collar 5 for outlet ports 7, which lead into an annulus 8 that is constructed within the housing 4 and extends through the centering collar 5. Inserted in the annulus 8 between the inlet ports 6 and the outlet ports 7 is an impeller 9 having blades 10. The impeller 9 is fastened to an impeller shaft 11 that is rotatably and axially movably mounted at either end of the annulus 8 in the housing 4. The impeller 9 is enclosed by a cylindrical sleeve 12 that is fastened to the radially outer ends of the blades 10 and extends in the direction of the outlet ports 7 beyond the edge of the blades 10. The sleeve 12 is located within a cylindrical bore section 13 of the housing 4 that is formed by a wear-resistant insert 14. A slight amount of clearance favorable for the smooth and easy movement of the sleeve 12 is provided between the sleeve 12 and the wall of the bore section 13.

The end of the impeller shaft 11 adjacent the outlet ports 7 is rigidly coupled to one end of a rotor 15 of a generator 16 arranged in the housing 4. Like the impeller shaft 11, the other end 17 of the rotor 15 is rotatably and axially movably mounted in the housing 4. A stator of the generator 16 that encloses the rotor 15 has two winding assemblies 18, 19 in side-by-side arrangement.

The end 17 of the rotor 15 projects into a fully enclosed compartment 20 of the housing 4 receiving therein an axially yielding support 21. The support 21 is comprised of several permanent magnets 22, 23, 24, which are arranged with mutually repelling poles in axial direction one behind the other. The permanent magnet 22 is fastened to the end 17 of the rotor 15 and is rotatable and axially movable with it. The permanent magnet 24 is fastened to the opposite end of the compartment 20. The permanent magnet 23 is located between the permanent magnets 22 and 24 and is axially movably mounted in the compartment 20.

The end 25 of the impeller shaft 11 remote from the generator 16 projects likewise into an enclosed compartment 26 accommodating a positioning device 27. The positioning device 27 has at least two permanent magnets 28, 29 arranged with their repelling poles one beside the other in axial direction. The permanent magnet 28 is fastened to the shaft end 25 and is rotatable and axially movable with it. The permanent magnet 29 is fastened to a screw 30 that is arranged in a tapped hole 31 extending through the compartment wall on the side opposite the shaft end 25 and projects into the compartment 26. By turning the screw it is possible to adjust the axial position of the permanent magnet 29 and hence the force of the positioning device 27.

Both compartments 20, 26 are interconnected by a throttling channel 32. The throttling channel 32 is comprised of a bore extending through the impeller shaft 11 and the rotor 15, and radial bores which are provided in the ends 17 and 25 and connect this bore with the compartments 26, 27. The compartments 20, 26 and the throttling channel 32 are filled with liquid. If the unit comprised of the impeller shaft 11 and the rotor 15 is moved in axial direction, part of this liquid is displaced out of the compartment into which the unit is introduced, through the throttling channel 32 and into the other compartment from which the unit is extracted, such that the occurring flow losses cause the axial movement of the unit to be dampened.

The winding connection diagram of the generator 16 is shown in FIG. 3. The winding assemblies 18, 19 are preferably comprised of three coil sets that are equally spaced apart circumferentially, delta-connected, and have taps at the connecting points of the coil sets. Such a circuit offers favorable conditions for commutatorless diode rectification with low residual ripple requiring only little smoothing effort. The one winding assembly 18 is connected by way of a rectifier bridge 35 to a power supply device 36, which is used to supply power to a signal controlling device 37 as well as to measuring devices arranged in the probe. The winding assembly 19 is connected by way of a rectifier bridge 38 to a switch 39 and a load resistor 40. By means of the signal controlling device 37 it is possible to actuate the switch 39 and hence apply an additional load to the generator by way of the winding assembly 19.

FIG. 1 shows the pulser 1 in a position of rest in which only the winding 18 of the generator 16 is active in order to maintain the normal power supply. In this position the impeller 9 is driven by the fluid current passing through the annulus 8, whereby a pressure drop arises between the inlet ports 6 and the outlet ports 7, generating an axial force acting on the impeller 9. This axial force is transmitted by way of the impeller shaft 11 and the rotor 15 to the yielding support 21, which absorbs the force. The axial force of the positioning device 27 also acts on the support 21. By varying this force with the screw 30 it is possible to set the position of the impeller 9 such that the outlet edge of the sleeve 12 is approximately flush with the edge of the outlet ports 7 in the position of rest. Accordingly, the cross section of opening of the outlet ports 7 is open over its full length.

To generate a pressure pulse the winding 19 of the generator 16 is connected to the load resistor 40 by the signal controlling device 37. The generator 16 is more heavily loaded as the result and decelerates the impeller 9 slightly. This leads to an increase in the pressure drop between the inlet side and the outlet side of the impeller 9 and hence to an increase in the axial force directed against the yielding support 21. Consequently, the distance between the permanent magnets 22, 23, 24 of the support 21 is decreased and the impeller 9 is moved together with the impeller shaft 11 and the rotor 15 toward the support 21, as shown in FIG. 2. As the result of this movement the sleeve 12 enters the area of the outlet ports 7, covering them to a considerable degree. The intensive throttling of the fluid flow caused as the result leads to a sudden pressure increase on the inlet side of the impeller 9. The pressure increase propagates itself through the channel 2 as far as the top of the liquid column at the earth's surface where it can be sensed as a pressure signal. Through a time-controlled sequence of pressure signals generated in this way it is possible to transmit measurement data obtained in the borehole to the earth's surface.

The device described in the foregoing is characterized by a simple construction, small overall length and high functional reliability. Furthermore, it enables an intensive throttling of the fluid current and hence particularly distinct and readily detectable pressure signals. The movement of the impeller, impeller shaft and rotor is hydraulically dampened, whereby interfering oscillations are effectively prevented. By controlling the generator load with the aid of different load resistors it is also possible to vary the throttling effect and hence adapt the signal amplitude to the actual conditions. The proportionate relation between the generator load and the resulting pulse amplitude offers the possibility of pulse amplitude modulation for transmitting coded signals in addition to pulse length multiplex or time multiplex signal coding. In this way the signal transmitting rate can be raised.

The device of the invention also offers the possibility of varying the signal amplitude from the earth's surface by issuing control commands from the earth's surface to actuate different load resistors provided for loading the generator. In addition to generating effective pressure pulses the device of the invention is also suitable for supplying measurement and control devices with electrical power. The outlay for batteries can thus be reduced. As the generation of signals is not directly dependent on the design of the impeller, the impeller can be optimized with regard to its service life and power generation.

What is claimed is:

1. A device for the generation of pressure pulses, being intended for transmitting signals, in a fluid-carrying channel, in particular a drill string for sinking a deep well, comprising
   a pulser designed to be placed in the channel and having a housing and an adjustable throttling device by means of which the flow resistance can be varied at least at one point of the channel,
   an electrical generator having a stator and a rotor,
   an impeller exposed to the fluid passing through the channel and designed to drive the rotor,
   a control device by means of which the load of the generator can be varied in response to control signals, and
   an actuating device that is connected to the throttling element and effects an adjustment of the throttling element responsively to the driving torque of the generator wherein
   the impeller is axially movably mounted and yieldingly supported against the direction of fluid flow such that the supporting force of the yielding support increases as the axial movement of the impeller increases, and wherein
   the throttling device includes an adjustable throttling element that is coupled to the impeller in such a way that the throttling element is adjusted in the sense of increasing the throttling effect by an axial movement of the impeller in the direction of fluid flow.

2. The device according to claim 1, characterized in that the impeller is fastened to an axially movable and rotatably mounted impeller shaft.

3. The device according to claim 2, characterized in that the impeller shaft is rigidly coupled to the rotor of the generator.

4. The device according to claim 1, characterized in that the yielding support of the impeller or the impeller shaft includes mutually repelling permanent magnets.

5. The device according to claim 1, characterized in that the yielding support includes a compression spring.

6. The device according to claim 5, characterized in that the supporting force of the compression spring is transmitted to the impeller or the impeller shaft by way of friction or antifriction bearings.

7. The device according to claim 1, characterized in that the impeller or the impeller shaft takes support upon a positioning device that generates an adjustable loading force directed against the supporting force of the yielding support.

8. The device according to claim 7, characterized in that the positioning device includes mutually repelling permanent magnets.

9. The device according to claim 7, characterized in that the positioning device is comprised of an axially adjustable axial bearing upon which the impeller or the impeller shaft takes support against the direction of flow of the impeller.

10. The device according to claim 9, characterized in that the axial bearing takes support on the positioning device by means of a compression spring.

11. The device according to claim 1, characterized in that the mutually opposing ends of the constructional unit comprised of the shafts of the impeller and the generator are each arranged in a compartment filled with a hydraulic medium, and that both compartments are interconnected by a throttling channel that penetrates the shafts in particular.

12. The device according to claim 1, characterized in that the generator includes two windings, a first winding for the electrical power requirement of a circuit and a second winding that is connected to the controlling device for the signal-dependent loading of the generator.

13. A device for the generation of pressure pulses, being intended for transmitting signals, in a fluid-carrying channel, in particular a drill string for sinking a deep well, comprising a pulser designed to be integrated in the channel and having a housing and an adjustable throttling device by means of which the flow resistance can be varied at at least one point of the channel, an electrical generator having a stator and a rotor, an impeller exposed to the fluid passing through the channel and designed to drive the rotor, a control device by means of which the load of the generator can be varied in response to control signals wherein the impeller is axially movably mounted and yieldingly supported against the direction of fluid flow such that the impeller is moved axially in the direction of fluid flow on an increase in the driving torque of the generator, wherein the impeller is arranged in an annulus of the housing that communicates with the channel on either side of the impeller, and provision is made on at least one side of the impeller for at least one radial opening that connects the annulus to the channel, and wherein the impeller has a cylindrical sleeve that at least partly covers the radial opening during an axial movement of the impeller in the direction of fluid flow, thus causing the current of fluid entering through the radial opening to be throttled.

14. The device according to claim 13, characterized in that the annulus on either side of the impeller is connected to the channel by way of at least one radial opening.

15. The device according to claim 13, characterized in that the radial opening coverable by the sleeve is arranged on the outlet side of the impeller.

16. The device according to claim 13, characterized in that the impeller is fastened to an axially movable and rotatably mounted impeller shaft, and that the impeller shaft is rigidly coupled to the rotor of the generator, wherein the mutually opposing ends of the constructional unit comprised of the shafts of the impeller and the generator are each arranged in a compartment filled with a hydraulic medium and both compartments are interconnected by a throttling channel that penetrates the shafts in particular.

17. The device according to claim 13, characterized in that the generator includes two windings, a first winding for the electrical power requirement of a circuit and a second winding that is connected to the controlling device for the signal-dependent loading of the generator.

* * * * *